(12) United States Patent
Xu et al.

(10) Patent No.: US 10,645,473 B2
(45) Date of Patent: May 5, 2020

(54) ALL-OPTICAL NETWORKS BASED ON SWITCHABLE WAVELENGTH CONNECTS (SWCS)

(71) Applicant: Futurewei Technologies, Inc., Plano, TX (US)

(72) Inventors: Qianfan Xu, San Jose, CA (US); Feng Zhang, San Jose, CA (US); Xiao Andy Shen, San Bruno, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/044,208

(22) Filed: Jul. 24, 2018

(65) Prior Publication Data

US 2019/0058932 A1    Feb. 21, 2019

Related U.S. Application Data

(60) Provisional application No. 62/545,759, filed on Aug. 15, 2017.

(51) Int. Cl.
*H04Q 11/00* (2006.01)
*H04J 14/02* (2006.01)
(Continued)

(52) U.S. Cl.
CPC ......... *H04Q 11/0005* (2013.01); *H04B 10/50* (2013.01); *H04B 10/66* (2013.01);
(Continued)

(58) Field of Classification Search
CPC ......... H04B 10/50; H04B 10/66; H04J 14/02; H04J 14/0267; H04J 14/0286;
(Continued)

(56) References Cited

U.S. PATENT DOCUMENTS 7,058,303 B2 *  6/2006  Yamada ............... H04J 14/0212
                                                    398/48
7,340,175 B2 *  3/2008  Wang .................. H04J 14/0212
                                                    385/16
(Continued)

FOREIGN PATENT DOCUMENTS

CN          1402460 A       3/2003
CN          1482814 A       3/2004

OTHER PUBLICATIONS

Machine Translation and Abstract of Chinese Publication No. CN1402460, Mar. 12, 2003, 13 pages.
(Continued)

*Primary Examiner* — Amritbir K Sandhu
(74) *Attorney, Agent, or Firm* — Conley Rose P.C.

(57) ABSTRACT

An all-optical network comprises: a first network; a second network; and a PWXC coupling the first network to the second network and comprising passive optical components. A method comprises: receiving a first optical signal from a first tail node of a first network; directing the first optical signal from a first input port of a PWXC to a first output port of the PWXC using first passive optical components; and transmitting the first optical signal to a third head node of a third network. An all-optical network comprising: a light bank; a first network coupled to the light bank; a second network coupled to the light bank; and a first PWXC coupling the first network and the second network.

24 Claims, 7 Drawing Sheets

(51) Int. Cl.
  *H04B 10/50* (2013.01)
  *H04B 10/66* (2013.01)

(52) U.S. Cl.
  CPC .......... *H04J 14/02* (2013.01); *H04J 14/0267* (2013.01); *H04J 14/0286* (2013.01); *H04Q 2011/0016* (2013.01); *H04Q 2011/0032* (2013.01); *H04Q 2011/0058* (2013.01)

(58) Field of Classification Search
  CPC ....... H04Q 11/0005; H04Q 2011/0016; H04Q 2011/0032; H04Q 2011/0058
  See application file for complete search history.

(56) References Cited

U.S. PATENT DOCUMENTS

| | | | | |
|---|---|---|---|---|
| 8,422,885 B2* | 4/2013 | Adhikari | ............ | H04W 88/085 370/329 |
| 8,457,496 B2* | 6/2013 | Zami | ................ | H04J 14/0204 398/48 |
| 9,173,012 B2* | 10/2015 | Meyer | ................ | H04Q 11/0005 |
| 9,654,851 B2* | 5/2017 | Sato | ................ | H04Q 11/0005 |
| 10,250,351 B2* | 4/2019 | Li | ................ | H04J 14/0212 |
| 2001/0038478 A1* | 11/2001 | Hwang | ............. | H04B 10/2503 398/79 |
| 2002/0063926 A1* | 5/2002 | Nishi | ................ | H04J 14/0212 398/82 |
| 2002/0076144 A1* | 6/2002 | Tai | ................... | H04Q 11/0005 385/24 |
| 2002/0154861 A1* | 10/2002 | Nara | ................ | G02B 6/12016 385/37 |
| 2003/0203740 A1* | 10/2003 | Bahl | ................ | H04W 52/46 455/516 |
| 2003/0206684 A1* | 11/2003 | Nishi | ................ | H04J 14/0209 385/17 |
| 2003/0206740 A1* | 11/2003 | Lee | ................ | H04B 10/503 398/79 |
| 2004/0008931 A1* | 1/2004 | Bacque | ................ | G02B 6/29317 385/24 |
| 2005/0036785 A1* | 2/2005 | Tervonen | ............. | H04B 10/272 398/49 |
| 2005/0053320 A1* | 3/2005 | Doerr | ................ | G02B 6/12021 385/15 |
| 2007/0116468 A1* | 5/2007 | Ji | ................ | H04J 14/02 398/79 |
| 2012/0082454 A1* | 4/2012 | Ooi | ................ | H04J 14/022 398/49 |
| 2013/0336653 A1* | 12/2013 | Ohlen | ................ | H04J 14/021 398/49 |
| 2016/0150300 A1* | 5/2016 | Sato | ................ | H04Q 11/0005 398/50 |
| 2016/0309243 A1* | 10/2016 | Zhang | ................ | H04J 14/02 |
| 2017/0164076 A1* | 6/2017 | Chen | ................ | H04J 14/0246 |
| 2017/0346445 A1* | 11/2017 | Shen | ................ | G02B 6/28 |
| 2017/0346592 A1 | 11/2017 | Liu et al. | | |
| 2019/0058932 A1* | 2/2019 | Xu | ................ | H04B 10/50 |

OTHER PUBLICATIONS

Machine Translation and Abstract of Chinese Publication No. CN1482814, Mar. 17, 2004, 9 pages.
Foreign Communication From a Counterpart Application, PCT Application No. PCT/CN2018/100267, English Translation of International Search Report dated Nov. 5, 2018, 5 pages.
Foreign Communication From a Counterpart Application, PCT Application No. PCT/CN2018/100267, English Translation of Written Opinion dated Nov. 5, 2018, 5 pages.

\* cited by examiner

ALL-OPTICAL NETWORKS BASED ON SWITCHABLE WAVELENGTH CONNECTS (SWCS)

CROSS-REFERENCE TO RELATED APPLICATIONS

This application claims priority to U.S. provisional patent application No. 62/545,759 filed on Aug. 15, 2017 by Futurewei Technologies, Inc. and titled "All-Optical Networks Based on Switchable Wavelength Connects (SWCs)," which is incorporated by reference.

STATEMENT REGARDING FEDERALLY SPONSORED RESEARCH OR DEVELOPMENT

Not applicable.

BACKGROUND

Optical networks are networks that use light waves, or optical signals, to carry data. Light sources such as lasers and LEDs generate optical signals; modulators modulate the optical signals with data to generate modulated optical signals; and various components transmit, propagate, amplify, receive, and process the modulated optical signals. Optical networks may implement WDM or other forms of multiplexing to achieve high bandwidths. Optical networks implement data centers, metropolitan networks, PONs, long-hauls, and other applications.

Some optical networks use electrical switching, electrical regeneration, and other electrical functions. However, all-optical networks maintain data signals in an optical domain. In other words, except for at endpoints, all-optical networks do not convert optical signals to electrical signals. All-optical networks therefore avoid electrical functions. Compared to networks that implement electrical functions, all-optical networks provide benefits such as reduced latency, reduced cost, simplified provisioning of services, higher bandwidth, improved efficiency, and less distance limitations.

SUMMARY

In one embodiment, the disclosure includes an all-optical network comprising: a first network; a second network; and a PWXC coupling the first network to the second network and comprising passive optical components. In some embodiments, the all-optical network is independent of optical cross-connects (OXCs); the first network and the second network are SWCs; the PWXC comprises only passive optical components; the PWXC is independent of active components, optical-to-electrical components, or electrical-to-optical components; the PWXC is one of an interleaver, one or more cascaded MZIs, a bandpass filter, a cyclic AWG, or cascaded 2×2 PWXCs; the PWXC comprises an input port and an output port, wherein the first network comprises a tail node coupled to the input port, and wherein the second network comprises a head node coupled to the output port; the head node comprises a light bank, and wherein the head node is configured to selectively receive an optical signal from either the PWXC or the light bank; and the first network is a first ring comprising a first SWC and a second SWC that share a first light bank, and wherein the second network is a second ring comprising a third SWC and a fourth SWC that share a second light bank.

In another embodiment, the disclosure includes a method comprising: receiving a first optical signal from a first tail node of a first network; directing the first optical signal from a first input port of a PWXC to a first output port of the PWXC using first passive optical components; and transmitting the first optical signal to a third head node of a third network. In some embodiments, the method further comprises: receiving a second optical signal from the first tail node; directing the second optical signal from the first input port to a second output port of the PWXC using second passive optical components; and transmitting the second optical signal to a fourth head node of a fourth network; the first passive optical components and the second passive optical components are the same; the method further comprises: receiving a second optical signal from a second tail node of a second network; directing the second optical signal from a second input port of the PWXC to the first output port using second passive optical components; and transmitting the second optical signal to the first head node; the method further comprises: receiving a second optical signal from a second tail node of a second network; directing the second optical signal from a second input port of the PWXC to a second output port of the PWXC; and transmitting the second optical signal from to a fourth head node of a fourth network; the directing is based on whether a wavelength channel of the first optical signal corresponds to an even wavelength or an odd wavelength or based on whether the wavelength channel corresponds to a high wavelength or a low wavelength; the directing is based on a number of the first input port in comparison to numbers of additional input ports; and the directing is based on the PWXC being partially loaded.

In yet another embodiment, the disclosure includes an all-optical network comprising: a light bank; a first network coupled to the light bank; a second network coupled to the light bank; and a first PWXC coupling the first network and the second network. In some embodiments, the all-optical network further comprises: a third network coupled to the first PWXC; and a fourth network coupled to the first PWXC; the all-optical network further comprises a second PWXC coupled to the third network and the fourth network; the all-optical network further comprises: a fifth network coupled to the second PWXC; and a sixth network coupled to the second PWXC.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations apply:
AWG: arrayed waveguide grating
DWDM: dense WDM
LED: light-emitting diode
MZI: Mach-Zehnder interferometer
OSNR: optical signal-to-noise ratio
OXC: optical cross-connect
PON: passive optical network
PWXC: passive wavelength cross-connect
SWC: switchable wavelength connect
WDM: wavelength-division multiplexing.

Figure 1:
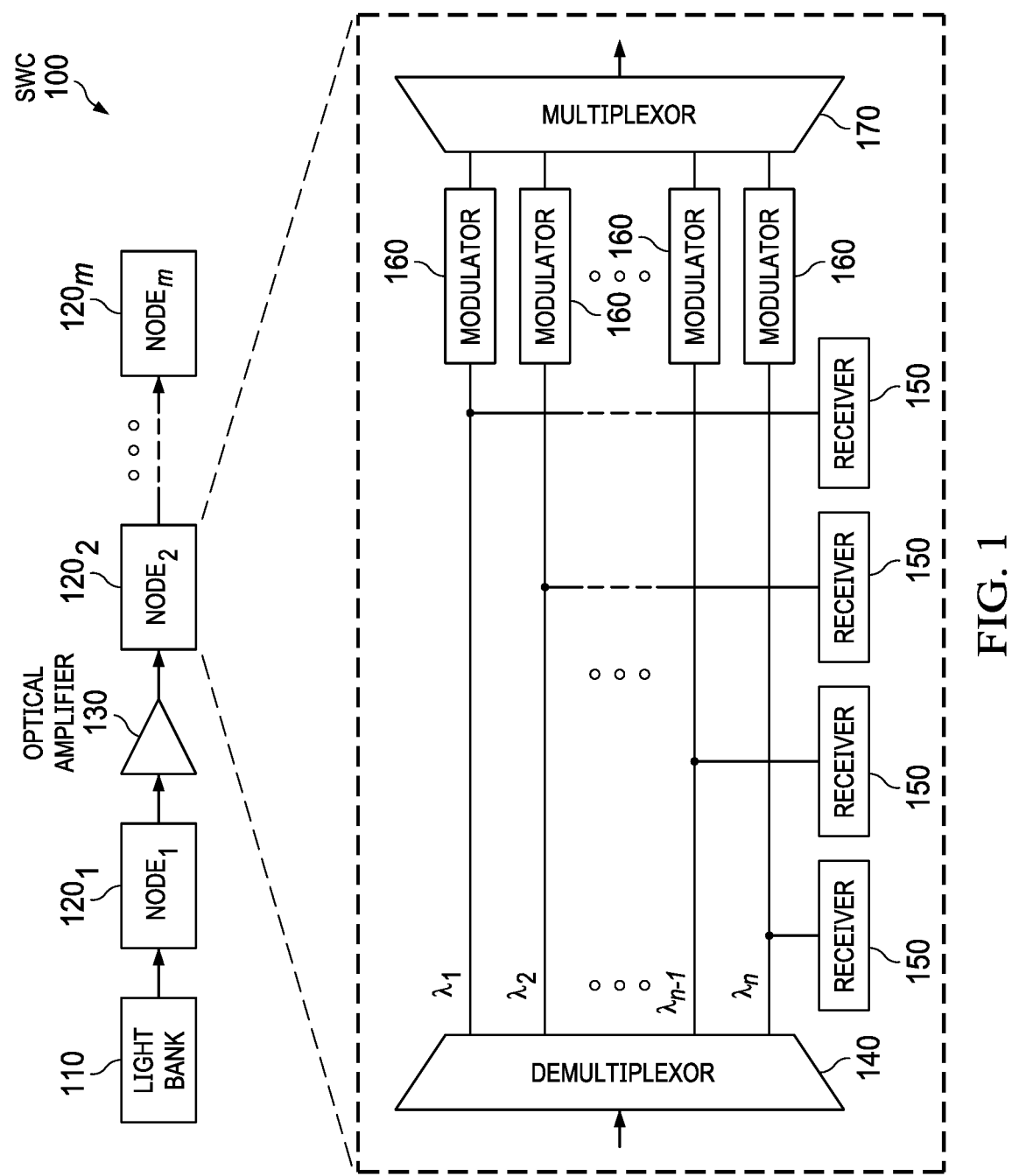
FIG. 1 is a schematic diagram of an SWC.

FIG. 1 is a schematic diagram of an SWC 100. The SWC 100 comprises a light bank 110, nodes$_{1-m}$ 120$_{1-m}$, and an optical amplifier 130. M is a positive integer. The light bank 110 comprises one or more lasers, LEDs, or other light sources that generate optical signals. The nodes$_{1-m}$ 120$_{1-m}$ may be similar to each other.

The node$_2$ 120$_2$ is expanded to show that it comprises a demultiplexer 140, receivers 150, modulators 160, and a multiplexer 170. The demultiplexer 140 demultiplexes n optical signals based on wavelengths $\lambda_{1-n}$, the receivers 150 receive and process the optical signals, the modulators 160 modulate a selectable set of the optical signals, and the multiplexer 170 multiplexes the optical signals. N is a positive integer.

The SWC 100 is a one-dimensional, bus-shaped DWDM network. One-dimensional means that each component of the SWC 100 is coupled to one other component of the SWC 100. Thus, if a component of the SWC 100 is coupled to multiple components, then the latter components are not part of the SWC 100. The light bank 110 may be referred to as a head end, the node$_1$ 120$_1$ may be referred to as a head node, and together the light bank 110 and node$_1$ 120$_1$ may be referred to as a head of the SWC 100. Node$_m$ 120$_m$ may be referred to as a tail node and a tail of the SWC 100.

The SWC 100 provides optical media between each pair of the nodes$_{1-m}$ 120$_{1-m}$ and therefore functions similar to a mesh network. The optical media comprise optical fibers, optical waveguides, or other optical media. Each of the nodes 1-$m$ may change the wavelengths used in the SWC 100. The SWC 100 supports burst-mode communication, packet switching, multicast functions, and broadcast functions. However, the number of the nodes$_{1-m}$ 120$_{1-m}$ is limited because each of the nodes$_{1-m}$ 120$_{1-m}$ introduces an optical insertion loss. The optical amplifier 130 and other optical amplifiers compensate for those optical insertion losses, but also reduce an OSNR.

To increase the number of nodes compared to the SWC 100, some all-optical networks couple multiple networks such as SWCs using OXCs. The OXCs multiplex and demultiplex optical signals from the networks based on wavelengths. However, the OXCs cause the all-optical networks to suffer from relatively slower switching speeds, higher optical power losses, higher cost, and increased wavelength contention. Managing such all-optical networks to ensure reliability and low latency is difficult, especially when those networks implement dynamic provisioning and burst traffic. There is therefore a need for all-optical networks that increase a number of nodes compared to single SWCs, but also avoid the limitations of OXCs.

Disclosed herein are embodiments for all-optical networks based on SWCs. The all-optical networks implement PWXCs that couple SWCs and provide rapid switching of traffic among the SWCs. The PWXCs use low-cost, passive optical components and therefore avoid OXCs, centralized optical switching fabrics, and wavelength contention. Compared to all-optical networks that use OXCs and all-optical networks that have only single SWCs, the disclosed all-optical networks benefit from a higher switching speed, a lower optical power loss, a lower latency, lower cost, and no wavelength contention. In addition, the disclosed all-optical networks support burst-mode traffic and do not need dynamic optical power management. Furthermore, the disclosed all-optical networks may implement all or part of data centers, metropolitan networks, PONs, longhauls, and other applications.

Figure 2:
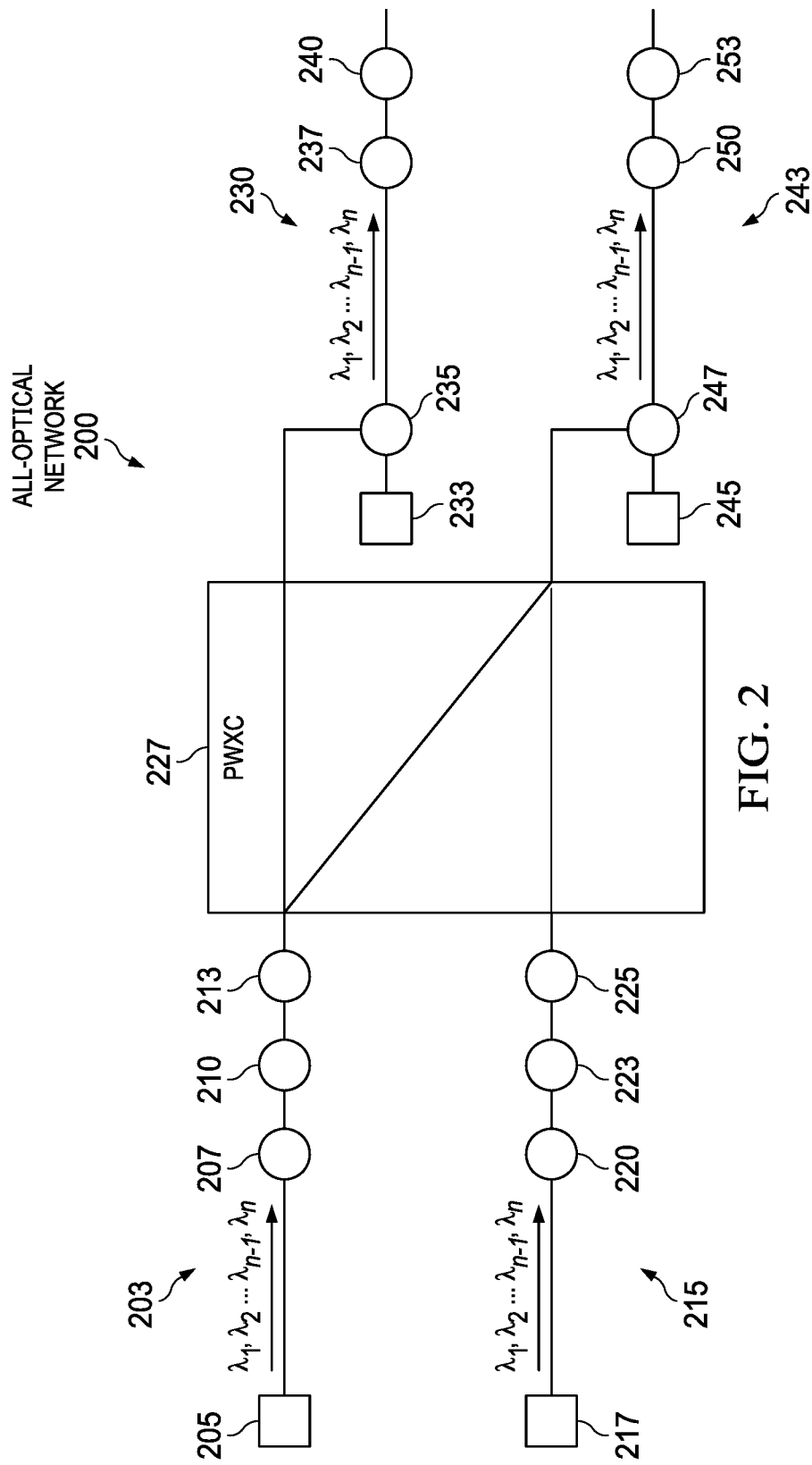
FIG. 2 is a schematic diagram of an all-optical network according to an embodiment of the disclosure.

FIG. 2 is a schematic diagram of an all-optical network 200 according to an embodiment of the disclosure. The all-optical network 200 comprises a PWXC 227 that couples four SWCs 203, 215, 230, 243. Though the all-optical network 200 is shown as comprising four SWCs 203, 215, 230, 243, the all-optical network 200 may comprise any suitable number of SWCs.

The PWXC 227 comprises passive optical components that allow an increase in a number of nodes that can couple to each other through all-optical means. The PWXC 227 may redirect optical signals of different wavelengths from input ports of the PWXC 227 to non-corresponding output ports of the PWXC 227. Thus, the PWXC 227 may function as a wavelength shuffler. The PWXC 227 may be independent of or exclude active, optical-to-electrical, or electrical-to-optical components. The PWXC 227 is described further below.

The SWCs 203, 215 230, 243 are similar to the SWC 100. The SWC 203 comprises a light bank 205 and nodes 207, 210, 213; the SWC 215 comprises a light bank 217 and nodes 220, 223, 225 and is similar to the SWC 203; the SWC 230 comprises a light bank 233 and nodes 235, 237, 240; and the SWC 243 comprises a light bank 245 and nodes 247, 250, 253. The light banks 205, 217, 233, 245 are similar to the light bank 110. The nodes 207, 210, 213, 220, 223, 225, 235, 237, 240, 247, 250, 253 are similar to the nodes 120$_{1-m}$. The node 213 is a tail node of the SWC 203, the node 225 is a tail node of the SWC 215, the node 235 is a head node of the SWC 230, and the node 247 is a head node of the SWC 243.

The SWCs 203, 230 couple tail to head so that the tail node 213 of the SWC 203 couples to the head node 235 of the SWC 230 through the PWXC 227. Switches of the node 235 in the SWC 230 cause the node 235 to either receive optical signals from the node 213 for communication from the SWC 203 or receive optical signals from the light bank 233 for internal communication in the SWC 230. Similarly, the SWCs 215, 243 couple tail to head so that the tail node 225 of the SWC 215 couples to the head node 247 of the SWC 243 through the PWXC 227. Switches of the node 247 in the SWC 243 cause the node 247 to either receive optical signals from the node 225 for communication from the SWC 215 or receive optical signals from the light bank 245 for internal communication in the SWC 243.

Figure 3:
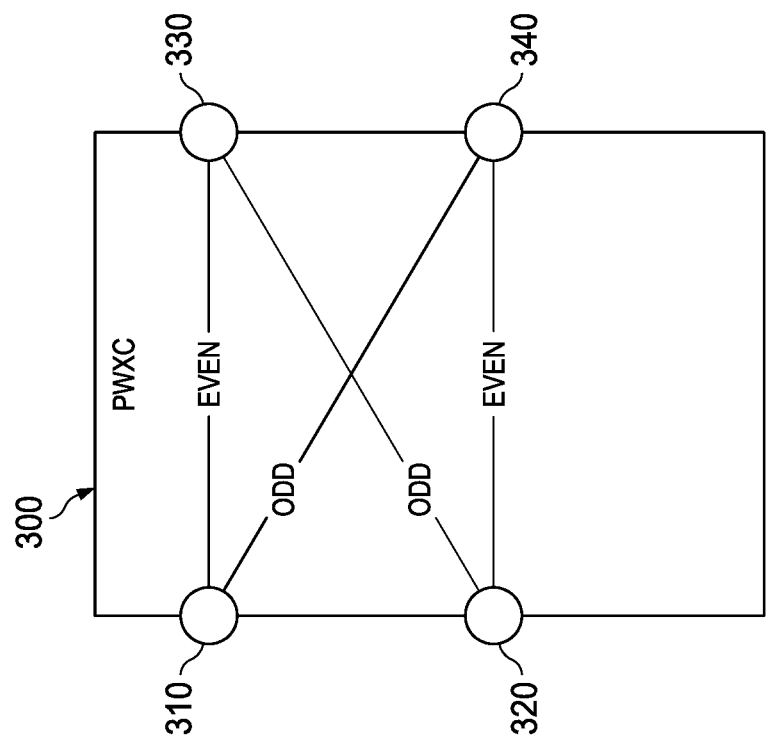
FIG. 3 is a schematic diagram of a PWXC according to an embodiment of the disclosure.

FIG. 3 is a schematic diagram of a PWXC 300 according to an embodiment of the disclosure. The PWXC 300 may implement the PWXC 227 in FIG. 2. The PWXC 300 may be an interleaver. The PWXC 300 comprises two input ports 310, 320 and two output ports 330, 340 and is therefore a 2×2 PWXC. The PWXC 300 accommodates wavelength channels corresponding to wavelengths of optical signals. For instance, a first wavelength channel corresponds to a wavelength $\lambda_1$, a second wavelength channel corresponds to a wavelength $\lambda_2$, and so on until an nth wavelength channel corresponds to a wavelength $\lambda_n$.

The PWXC 300 switches or directs even-numbered wavelength channels from input ports 310, 320 to corresponding output ports 330, 340. In this context, corresponding means physically opposite from, so the output port 330 is corresponding to the input port 310 and the output port 340 is corresponding to the input port 320. Thus, the PWXC 300 directs even-numbered wavelength channels from the input port 310 to the output port 330 and from the input port 320 to the output port 340. In contrast, the PWXC 300 directs odd-numbered wavelength channels from input ports 310, 320 to non-corresponding output ports 330, 340. In this context, non-corresponding means not physically opposite from, so the output port 330 is not corresponding to the input port 320 and the output port 340 is not corresponding to the input port 310. Thus, the PWXC 300 directs odd-numbered wavelength channels from the input port 310 to the output port 340 and from the input port 320 to the output port 330. Alternatively, the PWXC 300 directs even-numbered wavelength channels from input ports to non-corresponding output ports and directs odd-numbered wavelength channels from input ports to corresponding output ports.

Figure 4:
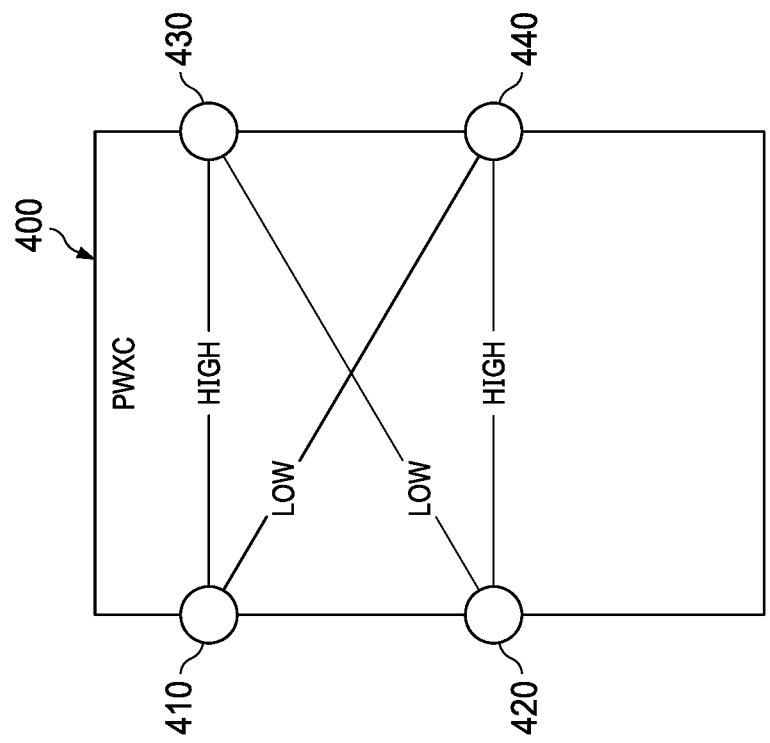
FIG. 4 is a schematic diagram of a PWXC according to another embodiment of the disclosure.

FIG. 4 is a schematic diagram of a PWXC 400 according to another embodiment of the disclosure. The PWXC 400 may implement the PWXC 227 in FIG. 2. The PWXC 400 comprises input ports 410, 420 and output ports 430, 440. The PWXC 400 may be one or more cascaded MZIs in an integrated optical platform or a bandpass filter.

The PWXC 400 is similar to the PWXC 300 in FIG. 3. However, the PWXC 400 directs high wavelength channels from the input ports 410, 420 to corresponding output ports 430, 440 and directs low wavelength channels from the input ports 410, 420 to non-corresponding output ports 430, 440. High wavelength channels are wavelength channels with corresponding wavelengths that have relatively higher values and are therefore relatively longer, and low wavelength channels are wavelength channels with corresponding wavelengths that have relatively lower values and are therefore relatively shorter. For instance, if n is even, then the PWXC 400 directs wavelength channels corresponding to wavelengths $\lambda_{n/2+1}$ to $\lambda_n$ from the input ports 410, 420 to corresponding output ports 430, 440 and directs wavelength channels corresponding to wavelengths $\lambda_1$ to $\lambda_{n/2}$ from the input ports 410, 420 to non-corresponding output ports 430, 440; and if n is odd, then the PWXC 400 directs wavelength channels corresponding to wavelengths $\lambda_{(n+1)/2}$ to $\lambda_n$ from the input ports 410, 420 to corresponding output ports 430, 440 and directs wavelength channels corresponding to wavelengths $\lambda_1$ to $\lambda_{(n-1)/2}$ from the input ports 410, 420 to non-corresponding output ports 430, 440. Alternatively, the PWXC 400 directs high wavelength channels from the input ports 410, 420 to non-corresponding output ports 430, 440 and directs low wavelength channels from the input ports 410, 420 to corresponding output ports 430, 440.

Figure 5:
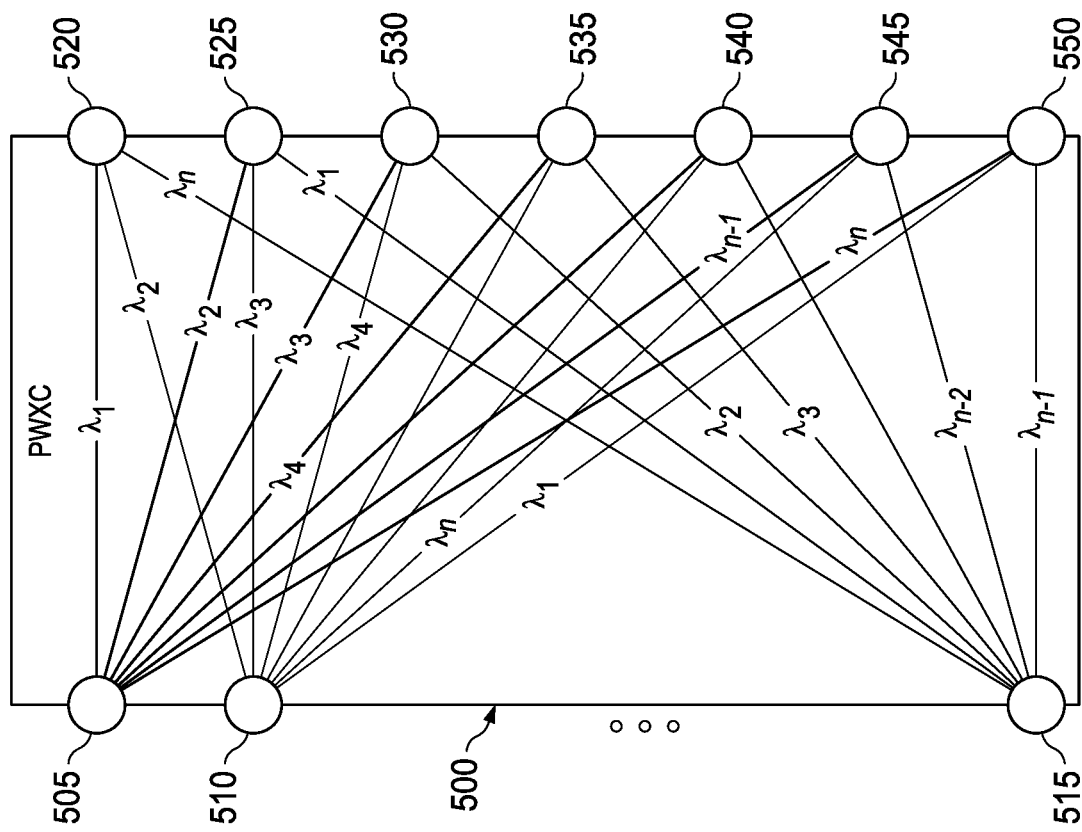
FIG. 5 is a schematic diagram of a PWXC according to yet another embodiment of the disclosure.

FIG. 5 is a schematic diagram of a PWXC 500 according to yet another embodiment of the disclosure. The PWXC 500 may implement the PWXC 227 in FIG. 2. The PWXC 500 may be a cyclic AWG or cascaded 2×2 PWXCs. The PWXC 500 comprises n input ports 505, 510, . . . , 515 and n output ports 520, 525, 530, 535, 540, 545, . . . , 550 and is therefore an n×n PWXC. The PWXC 500 accommodates wavelength channels corresponding to wavelengths of optical signals.

The PWXC 500 directs all wavelength channels from each of the input ports 505-515 to all of the output ports 520-550. The first input port 505 begins with a wavelength channel corresponding to wavelength $\lambda_1$ and ends with a wavelength channel corresponding to $\lambda_n$, the second input port 510 begins with a wavelength channel corresponding to wavelength $\lambda_2$ and ends with a wavelength channel corresponding to $\lambda_1$, and so on until the nth input port 515 begins with a wavelength channel corresponding to wavelength $\lambda_n$ and ends with a wavelength channel corresponding to $\lambda_{n-1}$. Alternatively, the input ports 505-515 and the output ports 520-550 begin with any other suitable wavelength channels and proceed with the wavelength channels in any other suitable order. The PWXC 500 therefore implements a full shuffling of the wavelength channels.

Figure 6:
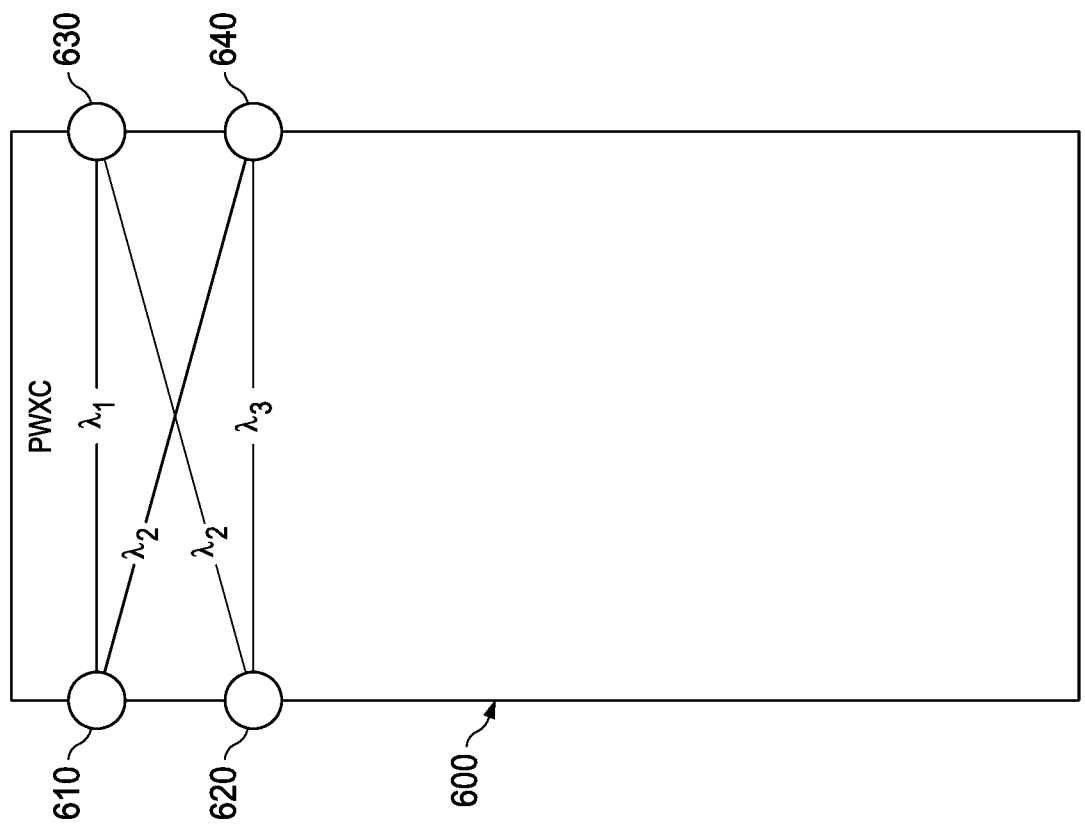
FIG. 6 is a schematic diagram of a PWXC according to yet another embodiment of the disclosure.

FIG. 6 is a schematic diagram of a PWXC 600 according to yet another embodiment of the disclosure. The PWXC 600 may implement the PWXC 227 in FIG. 2. The PWXC 600 comprises input ports 610, 620 and output ports 630, 640. The PWXC 600 is similar to the PWXC 300 in FIG. 3. However, the PWXC 600 is partially loaded, meaning that it does not direct all wavelength channels. Thus, the PWXC 600 directs from the input port 610 a wavelength channel corresponding to wavelength $\lambda_1$ and a wavelength channel corresponding to wavelength $\lambda_2$, but not a wavelength channel corresponding to $\lambda_3$; the PWXC 600 directs from the input port 620 a wavelength channel corresponding to wavelength $\lambda_2$ and a wavelength channel corresponding to wavelength $\lambda_3$, but not a wavelength channel corresponding to $\lambda_1$; and the PWXC 600 does not direct wavelength channels corresponding to wavelengths $\lambda_4$-$\lambda_n$ at all. Alternatively, the PWXC 600 directs wavelength channels in any other suitable partially loaded manner.

Figure 7:
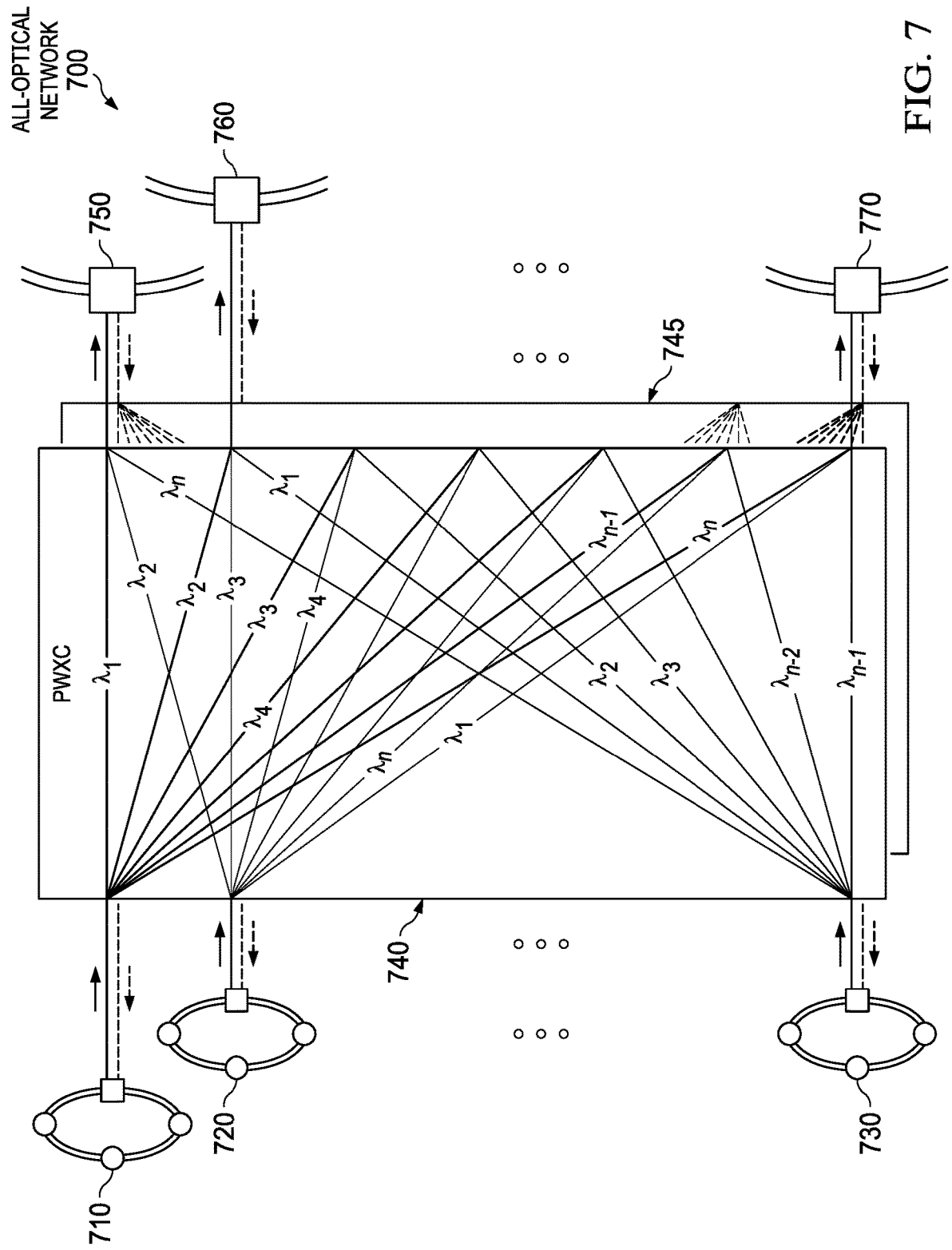
FIG. 7 is a schematic diagram of an all-optical network according to another embodiment of the disclosure.

FIG. 7 is a schematic diagram of an all-optical network 700 according to another embodiment of the disclosure. The all-optical network 700 is similar to the all-optical network 200 in FIG. 2. However, unlike the all-optical network 200, which comprises a PWXC 227 that couples four SWCs 203, 215, 230, the all-optical network 700 comprises PWXCs 740, 745 that couple n rings 710, 720, . . . , 730 on an input side of the PWXC 740 to n rings 750, 760, . . . , 770 on an output side of the PWXC 740. Each ring 710, 720, . . . , 730 and 750, 760, . . . , 770 comprises a light bank and nodes. A light bank of the ring 710 couples to a light bank of the ring 750 through the PWXCs 740, 745; a light bank of the ring 720 couples to a light bank of the ring 760 through the PWXCs 740, 745; a light bank of the ring 730 couples to a light bank of the ring 770 through the PWXCs 740, 745; and so on.

The PWXC 740 provides communication from the rings 710, 720, . . . , 730 to the rings 750, 760, . . . , 770. The PWXC 745 provides communication from the rings 750, 760, . . . , 770 to the rings 710, 720, . . . , 730. Alternatively, the PWXC 740 provides communication from the rings 750, 760, . . . , 770 to the rings 710, 720, . . . , 730, and the PWXC 745 provides communication from the rings 710, 720, . . . , 730 to the rings 750, 760, . . . , 770.

The rings 710-770 are similar to two SWCs bent around in semicircles to share a light bank. Thus, each node in a ring 710-770 may communicate with the other nodes in the same ring 710-770. In addition, each node in a ring 710-770 may communicate with every node in the other rings 710-770. Though the all-optical network 700 is shown as comprising n rings 710, 720, . . . , 730 on the input side of the PWXC 740 and n rings 750, 760, . . . , 770 on the output side of the PWXC 740, the all-optical network 700 may comprise any suitable number of rings.

Figure 8:
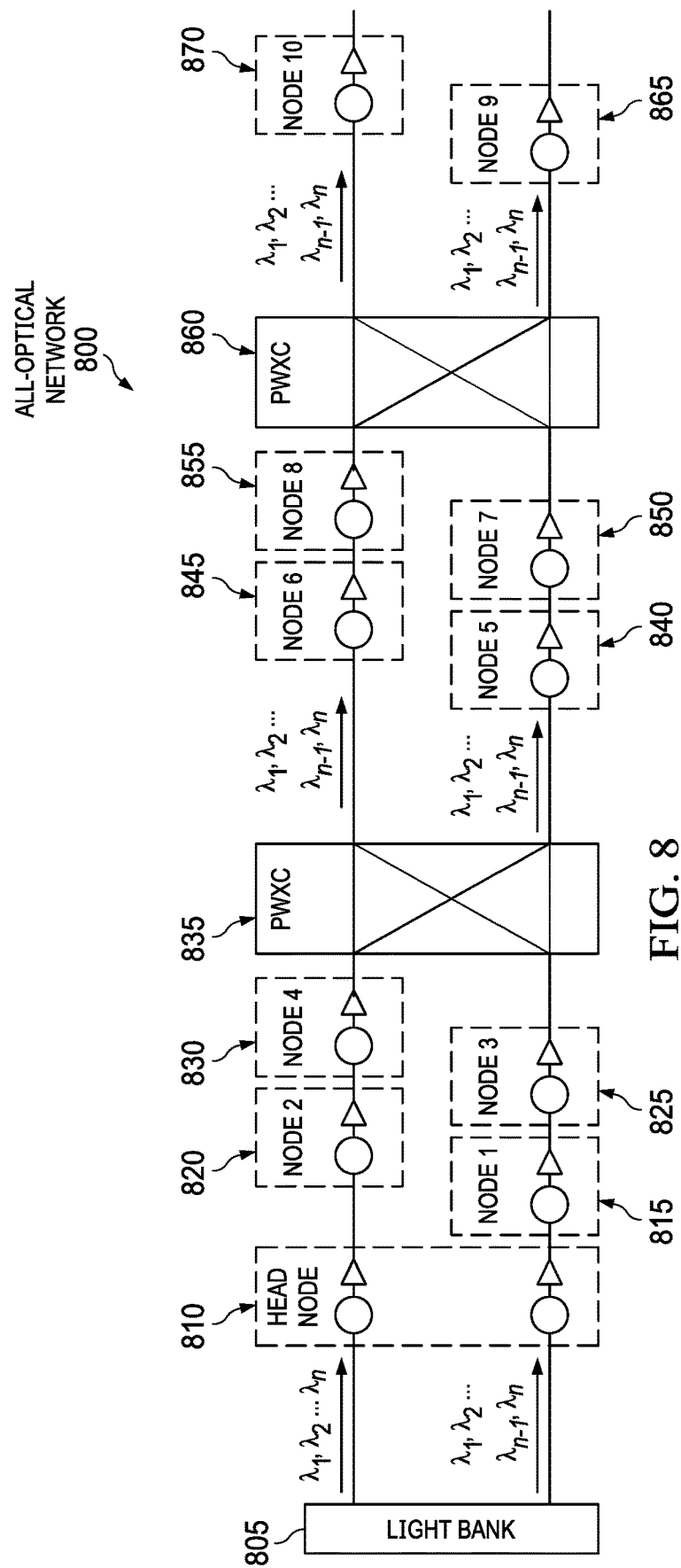
FIG. 8 is a schematic diagram of an all-optical network according to yet another embodiment of the disclosure.

FIG. 8 is a schematic diagram of an all-optical network 800 according to yet another embodiment of the disclosure. The all-optical network 800 comprises a light bank 805; a head node 810; node 1 815; nodes 2 820; node 3 825; node 4 830; node 5 840; node 6 845; node 7 850; node 8 855; node 9 865; node 10 870; and PWXCs 835, 860. The all-optical network 800 is similar to the SWC 100. However, unlike the SWC 100, which comprises a single optical medium coupling the nodes$_{1-m}$ 120$_{1-m}$, the all-optical network 800 comprises two optical media coupling the nodes 815-870 using cascaded PWXCs 835, 860 and thus forms an extended linear bus network.

The nodes 810, 820, 830 make up a first network, and the nodes 810, 815, 825 make up a second network. Thus, both the first network and the second network comprise the head node 810. In addition, the nodes 845, 855 make up a third network; the nodes 840, 850 make up a fourth network; the node 870 makes up a fifth network; and the node 865 makes up a sixth network.

The all-optical network 800 overcomes OSNR limits determined by numbers of amplifiers in each optical medium, while maintaining a high connectivity among nodes in each chain. While there is a loss of connectivity between the nodes 815, 825 on one hand and the nodes 820, 830 on the other hand, the nodes 815, 820, 825, 830 maintain connectivity with the remaining nodes 840, 845, 850, 855, 865, 870. Using two optical media, the all-optical network 800 doubles a number of nodes 815-870 that are possible.

Figure 9:
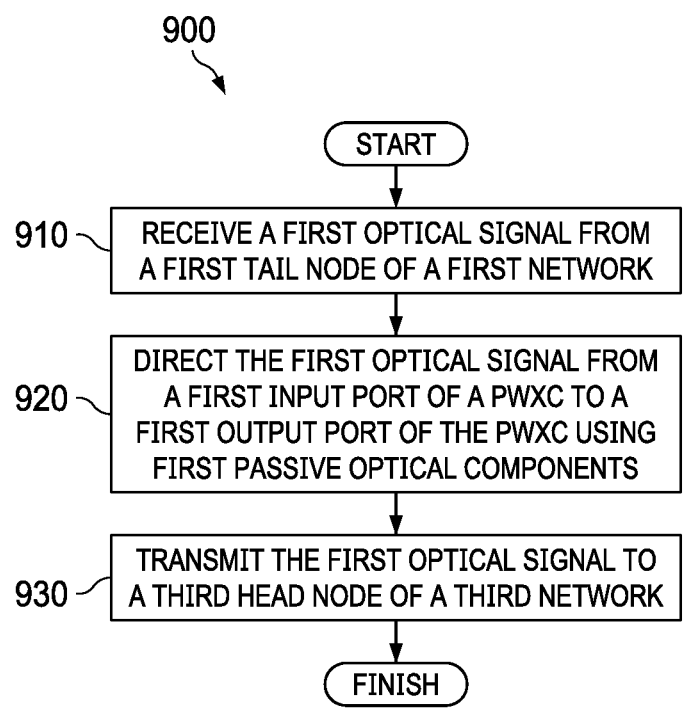
FIG. 9 is a flowchart illustrating a method of all-optical networking according to an embodiment of the disclosure.

FIG. 9 is a flowchart illustrating a method 900 of all-optical networking according to an embodiment of the disclosure. The all-optical networks 200, 700, 800 may implement the method 900. At step 910, a first optical signal is received from a first tail node of a first network. For instance, the PWXC 227 receives the first optical signal from the node 213. At step 920, the first optical signal is directed from a first input port of a PWXC to a first output port of the PWXC using first passive optical components. For instance, the PWXC 300, which implements the PWXC 227, directs the first optical signal from the input port 310 to the output port 330. Finally, at step 930, the first optical signal is transmitted to a third head node of a third network. For instance, the PWXC 227 transmits the first optical signal to the node 235.

In an example embodiment, an all-optical network comprises: a first network; a second network; and a PWXC element coupling the first network to the second network and comprising passive optical components.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An all-optical network comprising:
a first network;
a second network; and
a passive wavelength cross-connect (PWXC) coupling the first network to the second network and comprising passive optical components, the passive optical components comprise:
a first input port,
a first output port that is physically opposite from the first input port,
a second input port, and
a second output port that is physically opposite from the second input port,
the PWXC is configured to:
switch or direct a first optical signal from the first input port to the first output port when a first wavelength channel of the first optical signal is even-numbered,
switch or direct the first optical signal from the first input port to the second output port when the first wavelength channel is odd-numbered,
switch or direct a second optical signal from the second input port to the first output port when a second wavelength channel of the second optical signal is odd-numbered, and
switch or direct the second optical signal from the second input port to the second output port when the second wavelength channel is even-numbered.

2. The all-optical network of claim 1, wherein the all-optical network is independent of optical cross-connects (OXCs).

3. The all-optical network of claim 1, wherein the first network and the second network are switchable wavelength connects (SWCs).

4. The all-optical network of claim 1, wherein the PWXC comprises only passive optical components.

5. The all-optical network of claim 1, wherein the PWXC is independent of active components, optical-to-electrical components, or electrical-to-optical components.

6. The all-optical network of claim 1, wherein the PWXC is one of an interleaver, one or more cascaded Mach-Zehnder interferometers (MZIs), a bandpass filter, a cyclic arrayed waveguide grating (AWG), or cascaded 2×2 PWXCs.

7. The all-optical network of claim 1, wherein the first network comprises a tail node coupled to the first input port, and wherein the second network comprises a head node coupled to the first output port.

8. The all-optical network of claim 7, wherein the head node comprises a light bank, and wherein the head node is configured to selectively receive an optical signal from either the PWXC or the light bank.

9. The all-optical network of claim 1, wherein the first network is a first ring comprising a first switchable wavelength connect (SWC) and a second SWC that share a first light bank, and wherein the second network is a second ring comprising a third SWC and a fourth SWC that share a second light bank.

10. The all-optical network of claim 1, wherein the first wavelength channel is even-numbered, and wherein the second wavelength channel is odd-numbered.

11. The all-optical network of claim 1, wherein the first wavelength channel is odd-numbered, and wherein the second wavelength channel is even-numbered.

12. A method comprising:
receiving a first optical signal at a first input port of a passive wavelength cross-connect (PWXC);
receiving a second optical signal at a second input port of the PWXC;
directing, using first passive optical components, the first optical signal from the first input port to a first output port when a first wavelength channel of the first optical signal corresponds to a high wavelength value, the first output port is physically opposite from the first input port;
directing, using second passive optical components, the second optical signal to the first output port when a second wavelength channel of the second optical signal corresponds to a low wavelength value, the first output port is not physically opposite from the second input port;
transmitting the first optical signal from the first output port; and
transmitting the second optical signal from the first output port.

13. The method of claim 12, further comprising:
further receiving the first optical signal from a first tail node of a first network;
further receiving the second optical signal from the first tail node;
further transmitting the first optical signal to a third head node of a third network; and
further transmitting the second optical signal to a fourth head node of a fourth network.

14. The method of claim 13, wherein the first passive optical components and the second passive optical components are the same.

15. The method of claim 12, further comprising:
further receiving the first optical signal from a first tail node of a first network;
further receiving the second optical signal from a second tail node of a second network;
further transmitting the first optical signal to a third head node of a third network; and
further transmitting the second optical signal to the third head node.

16. The method of claim 12, further comprising:
further receiving the first optical signal from a first tail node of a first network;
further receiving the second optical signal from a second tail node of a second network;
further transmitting the first optical signal to a third head node of a third network; and
further transmitting the second optical signal to a fourth head node of a fourth network.

17. The method of claim 12, further comprising receiving the first optical signal from a first network, wherein the first network is associated with n wavelength values, wherein n is an even positive integer, wherein wavelength values $1-(n/2)$ are low wavelength values, and wherein wavelength values $[(n/2)+1]-n$ are high wavelength values.

18. The method of claim 12, further comprising receiving the first optical signal from a first network, wherein the first network is associated with n wavelength values, wherein n is an odd positive integer, wherein wavelength values $1-[(n-1)/2]$ are low wavelength values, and wherein wavelength values $[(n+1)/2]-n$ are high wavelength values.

19. An all-optical network comprising:
a light bank that is undedicated to a client;
a first network coupled to the light bank;
a second network directly coupled to the light bank; and
a first passive wavelength cross-connect (PWXC) coupling the first network to the light bank and the second network,
the light bank is physically separate from the first network, the second network, and the first PWXC, and
the light bank is configured to provide optical signals for the first network and the second network.

20. The all-optical network of claim 19, further comprising:
a third network coupled to the first PWXC; and
a fourth network coupled to the first PWXC.

21. The all-optical network of claim 20, further comprising a second PWXC coupled to the third network and the fourth network.

22. The all-optical network of claim 21, further comprising:
a fifth network coupled to the second PWXC; and
a sixth network coupled to the second PWXC.

23. The all-optical network of claim 19, further comprising a direct connection between the light bank and the second network.

24. The all-optical network of claim 19, wherein the first PWXC is positioned between the first network and the second network, and the second network is positioned between the first PWXC and the light bank.

* * * * *